(12) United States Patent
Follis et al.

(10) Patent No.: US 9,521,001 B2
(45) Date of Patent: Dec. 13, 2016

(54) PRIVACY PRESERVING ELECTRONIC DOCUMENT SIGNATURE SERVICE

(71) Applicant: Adobe Systems Incorporated, San Jose, CA (US)

(72) Inventors: Benjamin David Follis, Redwood City, CA (US); Marc Thomas Kaufman, Woodside, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 113 days.

(21) Appl. No.: 14/263,811

(22) Filed: Apr. 28, 2014

(65) Prior Publication Data

US 2015/0312227 A1    Oct. 29, 2015

(51) Int. Cl.
G06F 21/00 (2013.01)
H04L 9/32 (2006.01)
H04L 9/08 (2006.01)
H04L 29/06 (2006.01)

(52) U.S. Cl.
CPC ........... H04L 9/3247 (2013.01); H04L 9/0825 (2013.01); H04L 63/0428 (2013.01); H04L 63/126 (2013.01)

(58) Field of Classification Search
CPC .. H04L 9/3247; H04L 63/126; H04L 63/0428; H04L 9/0825
See application file for complete search history.

(56) References Cited

U.S. PATENT DOCUMENTS

| 2010/0198712 A1* | 8/2010 | Benisti ................. G06Q 10/107 705/34 |
| 2014/0019761 A1* | 1/2014 | Shapiro ................. H04L 9/3247 713/176 |

FOREIGN PATENT DOCUMENTS

KR    WO/2014/061895    *  4/2014

* cited by examiner

*Primary Examiner* — Kendall Dolly
(74) *Attorney, Agent, or Firm* — Keller Jolley Preece

(57) ABSTRACT

An electronic document signature system preserves the security of an electronic document while tracking a signature process corresponding to the electronic document. In particular, using a client application on a client device, an originating user can protect an electronic document and send the protected electronic document to a tracking server. The tracking server receives only a protected document such that the security the electronic document is preserved. Using a client applications on client devices, one or more participating users can subsequently receive the protected document from the tracking server, access the contents of the electronic document, and sign the electronic document. The tracking server can record events that occur with respect to the protected document to create an event log.

20 Claims, 8 Drawing Sheets

PRIVACY PRESERVING ELECTRONIC DOCUMENT SIGNATURE SERVICE

CROSS REFERENCE TO RELATED APPLICATIONS

N/A.

BACKGROUND

1. Technical Field

The present disclosure relates generally to providing an electronic document signature service. More specifically, one or more embodiments relate to systems and methods of securely tracking and verifying user signatures with respect to an electronic document.

2. Background and Relevant Art

Creating, sharing, and storing electronic documents is a common part of modern life. In many instances, business or individual users have the need to share an electronic document for purposes of obtaining various signatures. For example, users may desire to track an electronic signature (or "e-signature") process for an electronic document as multiple users sign the electronic document.

As is often the case, the various users that may need to sign a particular electronic document are geographically located throughout the world and/or are associated with different organizations. Therefore, some conventional electronic document signature services are standalone third-party services that can provide document access to each of the various users regardless of their geographic location or organization affiliation. For example, a user can send an electronic document to an electronic document signature service over the Internet. The various other users can access the electronic document by way of the signature service through the Internet, and the signature service can track the electronic signatures of the electronic document by the various other users.

Despite the conveniences, third-party electronic document signature services have a number of disadvantages. In particular, often an electronic document (e.g., a contract) contains sensitive or confidential information. The sensitive or confidential information creates issues for the users of the document signature service, as well as the providers of the document signature service.

In the first instance, most users are hesitant to send sensitive or confidential information to a third-party service. Regardless of the sophistication and reputation of the third-party provider, the third-party provider in conventional electronic document signature services has access to the sensitive or confidential information, which creates an inherent risk. For example, a data security breach in the document signature service could result in compromising the document contents. In many situations the risk of compromising the sensitive or confidential information outweighs the benefits of using the document signature system.

From a document signature service provider's perspective, there are a number of additional problems associated with storing electronic documents that contain sensitive or confidential information. For example, in the event that a security breach occurs within the document signature service, the provider may be liable for damages that result from the compromised sensitive and confidential information. Depending on the type of confidential information compromised, the provider's liability could be substantial. In addition, any compromise in sensitive and confidential information would severely diminish the brand of the provider, substantially damaging the provider's own business.

Providers not only have to focus on security threats from outside the system (e.g., malicious computer attacks), but they also have to set up security access systems and protocols to minimize security threats that may come from within the system (e.g., a defector employee). The security systems and features not only involve significant resources, but they often further complicate the operation of conventional document signature services. Moreover, even with the best security systems, features and procedures, a provider may never completely eliminate the risks associated with storing confidential information associated with a conventional document signature service.

In addition to the liability and expense associated with trying to protect confidential information, the providers of conventional electronic document signature services often deal with subpoenas and other requests to obtain electronic documents stored in the system. The time and resources needed to respond properly to subpoenas and other requests for information may create a large operational burden for the provider. Therefore, the mere fact that conventional document signature service providers have access to the contents of the documents may create a significant expense and burden.

These and other disadvantages may exist with respect to conventional electronic signature services.

SUMMARY

The embodiments disclosed herein solve one or more of the foregoing or other problems in the art with systems and methods for maintaining the security of electronic documents within an electronic document signature system. For example, the systems and methods provide an electronic document signature system that facilitates the signing of an electronic document by various users without storing an accessible version of the electronic document within the electronic document signature system. More specifically, one or more embodiments provide an electronic document signing service that efficiently tracks and is able to verify the electronic signature of a document (e.g., a contract), while at the same time preserving the security of the contents of the document.

In one or more embodiments, the electronic document signature system can allow a user to protect (e.g., encrypt) a document at a client device, and send the protected document to a tracking server of the electronic document signature system. Although the tracking server does not have access to the contents of the protected document, the tracking server can perform a verification process to ensure that the document the user intended to send was in fact the document the tracking server received. Moreover, the tracking server can track document events (e.g., signatures) and create a log of the events, thereby providing verification of the events without compromising the securing of the protected document contents.

The ability to track events associated with a protected electronic document allows the signing of an electronic document while maintaining the security of sensitive and confidential information within the electronic document. In particular, users of the electronic document signature system can use the system with confidence that the contents of the electronic document will remain confidential, while still benefitting from the conveniences of using an electronic signature service. In addition, the electronic document signature service provider can more efficiently operate the document signature service due to the reduced the liability risk of not having access to the contents of electronic documents.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope any embodiments. Rather the foregoing summary identifies aspects of embodiments as a prelude to the detailed description presented below.

BRIEF DESCRIPTION OF THE DRAWINGS

In order to describe the manner in which the above recited and other advantages and features can be obtained, a more particular description briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, one or more embodiments will be described and explained with additional specificity and detail through the use of the accompanying drawings in which.

DETAILED DESCRIPTION

Figure 1:
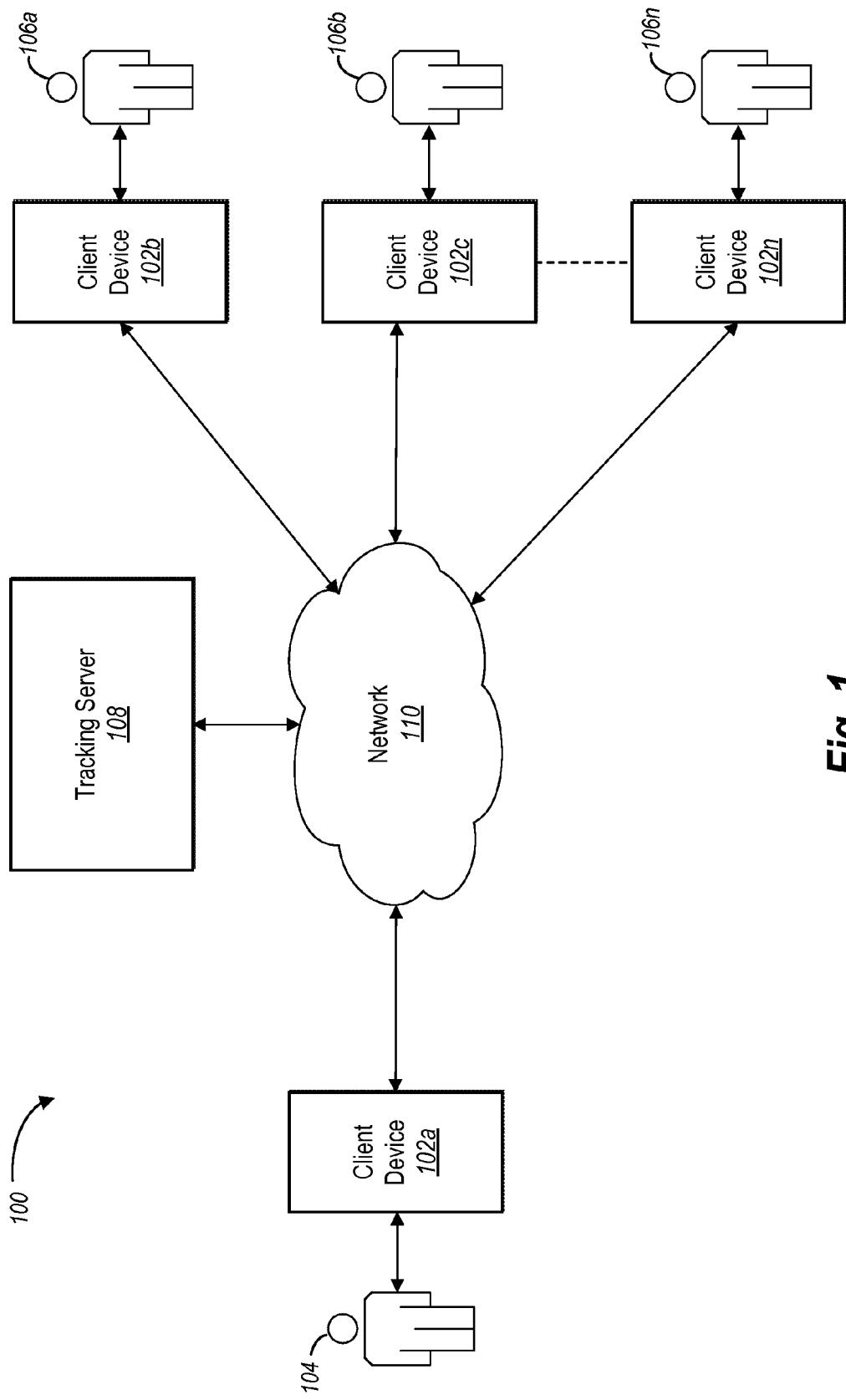
FIG. 1 illustrates a schematic representation of an electronic document signature system in accordance with one or more embodiments.

One or more embodiments of the present disclosure include an electronic document signature system that preserves the security of an electronic document while tracking a signature process corresponding to the electronic document. The electronic document signature system can include a tracking server in communication with one or more client applications running on one or more client devices. In particular, using a client application on a client device, an originating user can protect an electronic document and then submit the protected document to a tracking server for distribution to one or more participating users (e.g., users required to electronically sign the document). The tracking server receives only a protected version of the electronic document such that the security of the electronic document is preserved while stored on the tracking server. Using corresponding client applications, one or more participating users can subsequently receive the protected document from the tracking server, access the contents of the electronic document, and provide an electronic signature for the electronic document. Although the tracking server cannot access the contents of the electronic document, the tracking server is still able to record and verify events that occur with respect to the protected document. In particular, the tracking server can generate an event log representative of the tracked events associated with the protected document.

More specifically, in one or more embodiments, the methods and systems provide an electronic document signature system where an originating user uses a client application to protect an electronic document with a key. The originating user can send the protected document from the client application to the tracking server without sending the key to the tracking server. Accordingly, the tracking server has no way of accessing the contents of the electronic document. In addition, the originating user can send the key to one or more participating users. For example, the client application, out-of-band with the tracking server, can send the key to one or more participating users that need access to the electronic document to sign the electronic document. The one or more participating users can use one or more client applications to receive the protected document from the tracking server, unprotect (e.g., decrypt) the protected document using the key received from the originating user, and access the contents of the electronic document.

Upon accessing the electronic document, the participating user can perform one or more actions relative to the electronic document. For example, the participating user can provide an electronic signature for the electronic document. In some embodiments, the participating user can modify the document to include the electronic signature. Thereafter, the participating user can use one or more client applications to protect the signed electronic document, and send the protected, signed electronic document to the tracking server. The tracking server stores the protected, signed version of the electronic document, and logs the actions taken by the participating user in the event log. Accordingly, the tracking server stores both the original version of the electronic document and the signed version of the electronic document in a secure format and without accessing the contents of the multiple versions of the electronic document.

The tracking server can perform similar steps for additional participating users and additional versions of the electronic document. Once the electronic document has been distributed to, and electronically signed by, all participating users, the tracking server can generate and provide verification (e.g., within an event log) of all the actions taken by the various participating users and with respect to the various versions of the electronic document, without having access to the contents of the electronic document at any point in the process.

At any point within an electronic signature tracking process, a user (e.g., the originating user or a participating user), can access the tracking server and obtain the event log along with all the protected versions of the electronic document. Using the key, the user can access the contents of each version of the electronic document to verify proper signature of the electronic document by all participants. The user can then store this information on the user's local storage, or alternatively, the user can simply choose to maintain the protected documents and event log on the tracking server.

In one or more embodiments, the electronic document signature system can include a document verification process that verifies, for example, that the protected electronic document the tracking server receives is in fact the same protected electronic document sent by an originating user. For example, the originating user can use a client application to perform a hash function on the protected electronic document prior to sending the protected electronic document to the tracking server. Performing the hash function on the protected electronic document provides a first ID element (e.g., a hash value) that is stored at the client application. Upon receiving the protected electronic document, the tracking server can also perform the same hash function on the protected electronic document to create a second ID element. The tracking server can provide the second ID element to the originating user, and the originating user or an application on the originating user's client device can compare the first ID element to the second ID element to verify the correct file was received. Using this validation process, the tracking server is able to link actions taken by users to verified versions of the electronic document without actually accessing the contents of the electronic document.

The above and additional features of the electronic document signature system allow a user to track events related to a signature process of an electronic document with the convenience of a third-party tracking system. At the same time, users can have confidence in using the system because the contents of the electronic document are never shared with the electronic signature service provider.

In addition, using one or more embodiments of the disclosed system, the electronic signature service provider can decrease risk and liability because the provider is never in possession of the contents of the electronic documents. For example, in the event of a security breach, the security breach would not compromise sensitive or confidential information. Moreover, due to the fact the provider does not actually store unprotected versions of any electronic documents, the handling of subpoenas and other legal requests for information is significantly streamlined. Additional features and advantages will become apparent in light of the additional disclosure below.

As used herein, the terms "electronic document" and "document" refer to any data that can be stored in electronic form. In particular, an electronic document may include a data file. One or more examples of a data file may include a data file having a specific format (e.g., pdf, Word). Example content of an electronic document may include, but is not limited to, text, images, computer code, executable programs, computer-automated-design, video, audio, and any other type of content. In one or more embodiments, an electronic document can be a contract or other signature document.

As used herein, the term "protected electronic document" refers to a version of an electronic document that prevents access to the contents of the electronic document without the use of a key. For example, a protected electronic document can be an encrypted version of the electronic document, as will be explained in more detail below.

As used herein, the term "event" or "action" refers to any activity performed with respect to an electronic document or a protected electronic document. For example, an event or action can include, but is not limited to, sending a document, receiving a document, verifying a version of a document, viewing a document, signing a document, modifying a document, deleting a document, etc. An event can be a user-initiated action or a computer device-initiated action.

Referring now to the figures, FIG. 1 is a schematic representation of an example electronic document signature system 100 (or simply "system 100") in accordance with principles described herein. Although the system 100 can be used to track electronic documents in various ways, in one or more embodiments the system 100 can provide electronic document signature services. For example, the system 100 can facilitate the sending of an electronic document that includes a contract to various parties of the contract, and track the electronic signature of the contract by each party.

Although the system 100 will be described with reference to an electronic signature of a contract, one skilled in the art will appreciate that the principles described herein can be applied to any type of electronic document and for any particular purpose. For example, in one or more embodiments, the system 100 can facilitate and track one or more actions (e.g., review, approval) taken relative to CAD design files, computer code, images, or videos. Therefore, the system 100 can facilitate a signature process of electronic documents for a wide-range of applications.

As shown in FIG. 1, the system 100 can include client devices 102a through 102n (collectively or individually referred to as "client device(s) 102"), with n representing any quantity of client devices. Client devices 102 can comprise any suitable computing devices, such as the computing devices described below in reference to FIG. 8. For example, client devices 102 can include a laptop computer, desktop computer, mobile device, tablet, smart phone, etc. Thus, the client 102 can comprise software and hardware. For example, the client 102 can comprise one or more applications, such as a native application running on a computing device, as will be described further below.

Client device 102a can be associated with an originating user 104, as illustrated in FIG. 1. In one or more embodiments the originating user 104 is the user that initially provides an electronic document to the system 100. In addition, FIG. 1 illustrates that client devices 102b through 102n can be associated with participating users 106a through 106n (collectively or individually referred to as "participating users 106"). For example, participating users 106 can be one or more users asked to sign the electronic document after the originating user 104 provides the electronic document to the system 100.

In one or more embodiments, the originating user 104 can set the preferences, permissions, and/or other parameters that correspond to an electronic document and the actions to be taken with respect to the electronic document. For example, the originating user 104 can identify participating users 106 to invite to sign the electronic document using the system 100. In addition, the originating user 104 can grant/restrict permissions for each of the participating users 106 (e.g., permission to access different versions of the electronic document or related information, such as an event log). The originating user 104 can set various other permissions and parameters depending on a particular implementation of the system 100, as will be described in more detail below.

As further illustrated in FIG. 1, the system 100 can include a tracking server 108. The tracking server 108 can comprise one or more server devices. The tracking server 108 can facilitate the tracking of one or more actions performed relative to an electronic document provided by originating user 104. For example, the tracking server 108 can facilitate and track the electronic signature of the electronic document by one or more of the participating users 106. As shown, the client devices 102 and the tracking server 108 are communicatively coupled through a network 110. In addition, the client devices 102 can be communicatively coupled to one another by way of the network 110, or by way of another network. The network 110 can be any communication channel, such as the Internet, an intranet, or other type of network. Additional description related to the network 110 is included below with respect to FIG. 8.

In general, in one or more embodiments, the system 100 allows the originating user 104 to use client device 102a to send an electronic document to the tracking server 108 through the network 110. In addition, the system 100 can allow the originating user 104 to send information directly to the client devices 102 of the participating users 106 through network 110. For example, the originating user 104 can send a key to the participating users 106 that allows the participating users 106 to gain access to the contents of the electronic document.

Furthermore, in one or more embodiments, the tracking server 108 can send information to and receive information from one or more of the participating users 106 by way of the network 110 and one or more of the client devices 102. For example, the tracking server 108 can send an electronic document to one or more of the client devices 102 for signature by one or more of the participating users 106. Similarly, once signed, the participating users 106 can send the signed electronic document back to the tracking server 108.

As briefly explained above, the system 100 allows the client devices 102 to communicate separately with each other and/or with the tracking server 108. In particular, the client device 102a can send a communication to the tracking server 108 that is not sent to any of the other client devices 102. Moreover, the client device 102a can send a communication to one of the other client devices 102 that is not sent to the tracking server 108. Thus, the system 100 provides a system that allows the originating user 104 to send a protected electronic document to tracking server 108 without a key, ensuring that the contents of the protected electronic document remain private. The originating user 104, however, can then send the key to one or more participating users 106 to allow the participating users 106 to gain access to the contents of the protected electronic document, as will be explained in more detail below.

Figure 2:
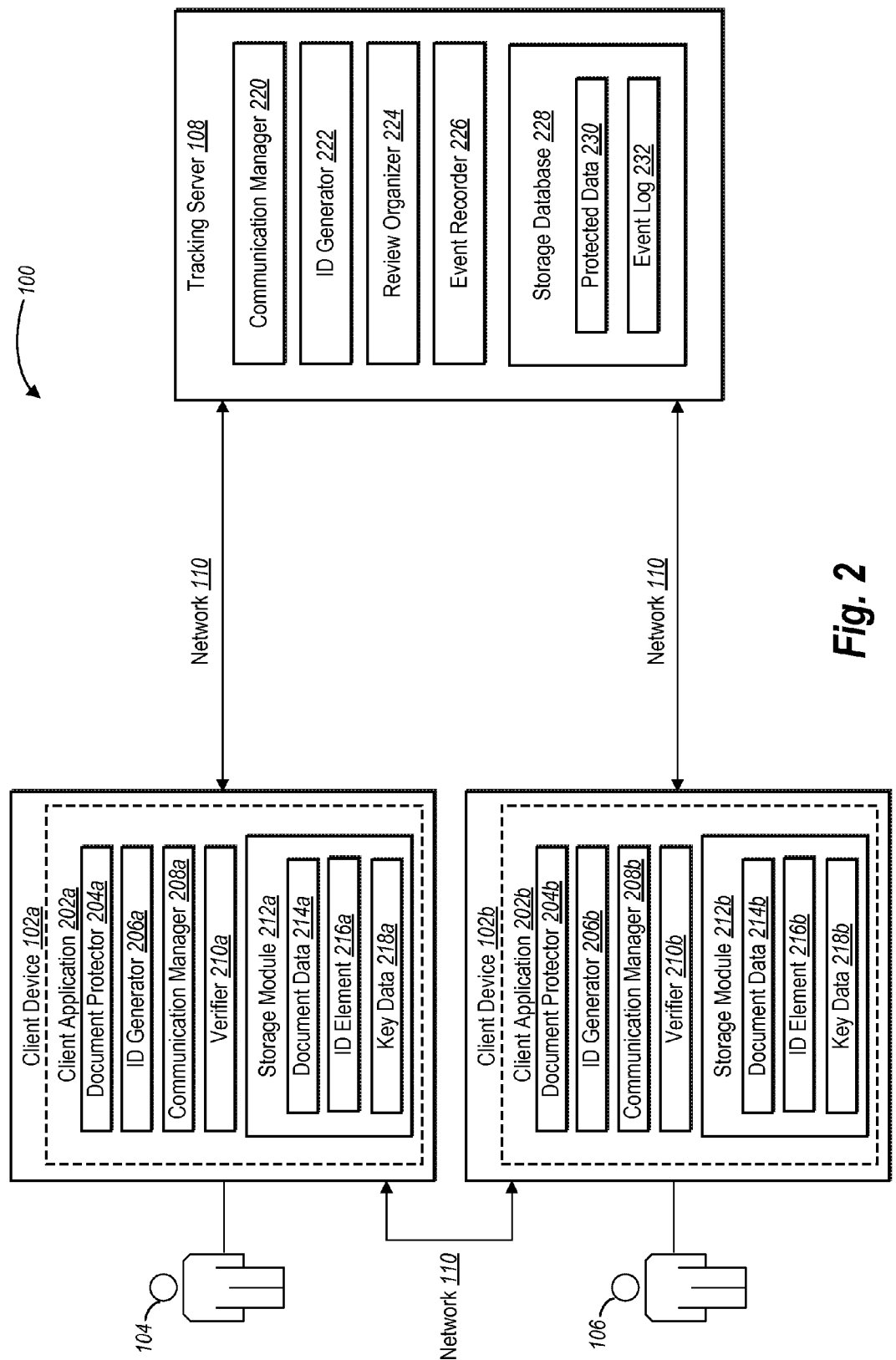
FIG. 2 illustrates another schematic representation of an electronic document signature system in accordance with one or more embodiments.

FIG. 2 illustrates a more detailed schematic diagram of the system 100 showing various components of the client devices 102a and 102b, as well as various components for tracking server 108. For example, the client device 102a can include a client application 202a, as shown in FIG. 2. Although FIG. 2 illustrates that the client application 202a is a single application, in one or more embodiments the client application 202a can be multiple applications. For example, various processes involved in the system 100 can use various client applications. For example, a first client application can perform one or more operations to protect an electronic document, a second client application can perform a hash function on the protected electronic document, and a third client application can send various data to the tracking server 108 and/or one or more client devices 102 associated with one or more participating users 106. In addition, the client application 202a can be a portion of a parent application. For example, a user can activate the client application 202a by selecting one or more options within a user interface associated with the parent application. An example of a parent application, within which the client application 202a can be implemented, is ADOBE ACROBAT.

In one or more embodiments, the client application 202a is a native or standalone application that executes on the client device 102a. For example, although the client application 202a can communicate with the tracking server 108 and the client device 102b, the client application 202a can operate independent of the tracking server 108 and the other client devices 102. In other words, the client application 202a allows the client device 102a to selectively share information with the tracking server 108 and the other client devices 102. For example, the client application 202a can allow the client device 102a to share information with the client device 102b out-of-band of communications with the tracking server 108.

As further illustrated in FIG. 2, the client application 202a can include a document protector 204a, an ID generator 206a, a communication manager 208a, a verifier 210a, and storage manager 212a. Each of the components 204a-212a of the client application 202a can be in communication with one another using any suitable communication technologies. It is recognized that although the components 204a-212a of the client application 202a are shown to be separate in FIG. 2, any of components 204a-212a may be combined into fewer components, such as into a single component, or divided into more components as may serve a particular implementation.

The components 204a-212a can comprise software, hardware, or a combination thereof. For example, the components 204a-212a can comprise one or more instructions stored on a computer-readable storage medium and executable by processors. When executed by the one or more processors, the computer-executable instructions of the client application 202a can cause the computing device 102a to perform the methods described herein. Alternatively, the components 204a-212a can comprise hardware, such as a special purpose processing device to perform a certain function or group of functions.

As mentioned above, the originating user 104 may desire to facilitate electronic signature of an electronic document by one or more participating users 106 in a way that protects the contents of the electronic document. The document protector 204a can perform one or more functions to protect the contents of an electronic document by preventing access to the contents thereof by any party not having authorization. For example, in one or more embodiments, the document protector 204a can protect the electronic document by encrypting the electronic document. In particular, the originating user 104 can identify the electronic document to protect (e.g., browse and select the electronic document from a location on client device 102a), and the document protector 204a can encrypt the electronic document to provide a protected electronic document. The storage manager 212a can store the protected electronic document permanently or temporarily in document data 214a, as illustrated in FIG. 2.

The document protector 204a can encrypt the document using various encryption techniques and encryption algorithms. In general, the document protector 204a can use an encryption scheme to transform the readable data in the electronic document to unreadable data, or ciphertext. The resultant ciphertext data is stored in the protected electronic document. The document protector 204a can essentially use any known or customized encryption scheme, technique or algorithm to provide the protected electronic document.

In addition to encrypting the electronic document, the document protector 204a can also provide a key that can be used to decrypt the protected electronic document. For example, upon encrypting the electronic document, the document protector 204a can provide a decryption key—which may be the same as an encryption key used to encrypt the electronic document—for storage as key data 218a in storage manager 212a, as illustrated in FIG. 2. The decryption key can be any number of bits, but a key length of at least 80 bits is preferred, and a key length of 128-bits is more preferred. The key size can depend on the type of encryption scheme used, as well as the desired amount of security for the protected electronic document.

In some embodiments, the key can be a user-supplied key, such as a password. For example, the originating user 104 can provide a password or code to the document protector 204a that the document protector 204a can use to protect the electronic document. In addition, the document protector 204a can require a minimum amount of characters and/or a minimum type of characters to ensure the originating user 104 provides a password with a sufficient degree of security.

In one or more alternative embodiments, the key can be a digital certificate that the originating user 104, or other user, distributes to a particular group of participating users 106. For example, an organization may distribute a particular digital certificate to one or more participating users 106. In one example embodiment, the executive team of an organization can each have an executive team digital certificate. Therefore, if the electronic document is a contract that each member of the executive team must sign, the originating user 104 can select the pre-distributed executive team digital certificate as the key.

Once the document protector 204a protects the electronic document, the client application 202a can use the ID generator 206a to process the protected electronic document to create a client-generated ID element associated with the protected electronic document. The client-generated ID element can be stored in ID element data 216a by the storage manager 212a, as illustrated in FIG. 2. In general, the client-generated ID element is used by the client application 202a to verify that the protected electronic document that the tracking server 108 receives from the client application 202a is the same protected electronic document that client application 202a sent. The client-generated ID element is useful to verify the protected electronic document, as will be discussed further below with respect to the verifier 210a.

In one or more embodiments, the ID generator 206a performs a hash function on the protected electronic document. For example, the ID generator 206a can calculate a cryptographic hash of the protected electronic document and use the resulting hash value as the client-generated ID element. Non-limiting examples of a cryptographically secure hash include, but are not limited to, MD5, SHA-2, or any SHA-256 function. The ID generator 206a, however, can use any cryptographic hash function that can take a block of data (e.g., the protected electronic document) and return an identifier, such as a fixed-sized bit string, that is unique to the data block. The fix-sized bit string is known as a cryptographic hash value, or for purposes of this application, the ID element. With a cryptographic hash function, any change to the block of data (e.g., to the protected electronic document) will change the calculated cryptographic hash value, or ID element.

The ID generator 206a, however, is not limited to providing a cryptographic hash value as the client-generated ID element. For example, in alternative embodiments, the ID generator 206a can use a checksum or other similar function.

In general, the ID generator 206a can employ any function and/or algorithm that can be duplicated on the tracking server 108 to produce a client-generated ID element that can be compared to a server-generated ID element, as will be discussed further below.

With the protected electronic document, the ID element, and the key, the client application 202a can send specific information to both the tracking server 108 and the client device 102b. For example, and as mentioned briefly above, the client application 202a can include a communication manager 208a, as illustrated in FIG. 2. In general, communication manager 208a can facilitate sending and receiving electronic communications. For instance, the communication manager 208a can package content to be included in an electronic communication, format the electronic communication in any necessary form that is able to be sent through one or more communication channels, and use an appropriate communication protocol, as described below with reference to FIG. 8. In particular, the communication manager 208a can facilitate receiving and sending data to and from the tracking server 108. In addition, the communication manager 208a can facilitate receiving and sending data to and from the client device 102b.

In one or more embodiments, the communication manager 208a can cause the client application 202a to prompt the originating user 104 to provide or otherwise identify one or more participating users 106 to include in the signature process of the electronic document. For instance, the originating user 104 can provide to the communication manager 208a one or more user IDs associated with one or more participating users 106. In one embodiment, a user ID can be an email address. Alternatively, the tracking system 200 can require an account creation process to use the tracking system 200. In such an instance, the user ID can be a screen name, username, alias, or other ID that a user selects upon creating an account for the system 100. Regardless of the type of user ID, the user ID can enable the communication manager 208a to communicate with the participating user 106 associated with the user ID.

Upon obtaining user IDs for the one or more participating users 106, the communication manager 208a can send the key corresponding to the protected document to one or more client devices 102 associated with the one or more participating users 106. For example, and as illustrated in FIG. 2, the communication manager 208a can send the key to client device 102b. In the event the key is a pre-distributed key, the communication manager 208a can simply send a message that identifies the key needed to access the contents of the protected electronic document.

In one example embodiment, the communication manager 208a can cause the client device 102a to send an email message (e.g., either directly from the client application 202a, or by accessing an email application on the client device) that contains the key in the body of the email message or as an attachment to the email message. Alternatively, the communication manager 208a can send the key using other types of electronic messages, such as a text message, SMS message, or any other communication protocol. For instance, the communication manager 208a can send the client device 102b any type of electronic communication as long as the electronic communication is sent out-of-band of the tracking server 108. By doing so, the communication manager 208a ensures that the electronic communication containing the key is never sent to or through the tracking server 108.

In addition to the key, the communication manager 208a can send additional information to the client device 102b.

For example, in one or more embodiments, the communication manager 208a can send a participating user data package that contains the key, the subject of the electronic document (e.g., Sales Contract), the identification of the originating user, the identification of any other participating users, instructions on how to use the system 100, and/or a customized message that the originating user 104 can provide. In one or more alternative embodiments, communication manager 208a can send client device user authentication information that the participating user 106 can provide to the tracking server 108 to authenticate the participating user's 106 identity.

As illustrated in FIG. 2, client device 102b includes a client application 202b that includes the same or similar components as client application 202a. In one or more embodiments, the client application 202b is similar to, or identical to, the client application 202a and can include each of the components and features described above with respect to the client application 202a. In addition, client application 202a can include each of the components and features that will be described below with respect to client application 202b.

Accordingly, client device 102b associated with participating user 106 can include a communication manager 208b that receives the electronic communication from client device 102a, as illustrated in FIG. 2. In one or more embodiments, the electronic communication is an email, and therefore, the communication manager 208b can simply include an email application, or access to an email application, to receive the email with the above-described data and information. Upon receipt of the information, the key can be stored in key data 218b and the other information can be stored in document data 214b in storage manager 212b for later use by the client application 202b, as will be discussed further below.

Prior to, subsequent to, or simultaneously with sending the key to a participating user 106, the communication manager 208a can send a server data package to the tracking server 108. As illustrated in FIG. 2, the tracking server 108 can include one or more components. For example, the tracking server 108 can include a communication manager 220, an ID generator 222, a review organizer 224, an event recorder 226, and a storage database 228. As with the client application 202a components, each of the components 220-228 of the tracking server 108 can be in communication with one another using any suitable communication technologies. It is recognized that although the components 220-228 of the tracking server 108 are shown to be separate in FIG. 2, any of components 220-228 may be combined into fewer components, such as into a single component, or divided into more components as may serve a particular implementation.

The components 220-228 can comprise software, hardware, or both. For example, the components 220-228 can comprise one or more instructions stored on a computer-readable storage medium and executable by processors of one or more computing devices. When executed by one or more processors, the computer-executable instructions can cause the tracking server 108 to perform the methods described herein. Alternatively, the components 220-228 can comprise hardware, such as a special purpose processing device to perform a certain function or group of functions. Additionally or alternatively, the components 220-228 can comprise a combination of computer-executable instructions and hardware.

As mentioned above, the communication manger 208a of the client device 102a can send a server data package to the tracking server 108. The communication manager 220 of the tracking server 108 can facilitate receiving the server data package. In one or more embodiments, the server data package can include the protected version of the electronic document and a user ID of for the participating user 106. Additionally, the server data package can include the originating user ID, the type of method/algorithm the client device used to calculate the client-generated ID element, and a document/project name assigned by the originating user 104 (e.g., Sales Contract). In order to maintain the security of the protected electronic document on the tracking server 108, the server data package does not include the key corresponding to the protected electronic document.

Upon receiving the server data package, the event recorder 226 can create an event log 232 that is associated with the protected electronic document. The event recorder 226 records the receipt details of the server data package in the event log 232. For example, the event recorder 226 can record one or more items in the event log 232 that include, but are not limited to, the time of receipt, the originating user 104 user ID, a document name assigned by the originating user 104, the type of method/algorithm used by the client device to generate the ID element, the storage size of the protected electronic document, and/or the one or more participating user 106 user IDs. In this way, the event log 232 can contain an initial tracked event associated with the protected electronic document.

Note that when the tracking server 108 receives the server data package, the tracking server 108 does not attempt to process the content of the protected electronic document. Even if the tracking server 108 did attempt to process the content of the protected electronic document, the tracking server 108 could not access the content of the protected electronic document because the tracking server 108 does not have access to the key used to protect the electronic document.

Although the tracking server 108 does not process the content of the protected electronic document, the tracking server can include one or more components to provide a verification process to verify the contents of the protected electronic document. In one or more embodiments of the system 100, the tracking server 108 can include an ID generator 222. The tracking server 108 can use the ID generator 222 in a verification process to allow the originating user 104 to confirm the protected electronic document the tracking server 108 received is in fact the same protected electronic document the client device 102a sent. In particular, the system 100 adds additional benefit when the tracking system can provide within the event log 232 a verification event that the protected electronic document received by the tracking server 108 was not tampered or altered in transit from the client device 102a to the tracking server 108.

In order to provide verification of the protected electronic document, the communication manager 220 can obtain the protected electronic document from the server data package and send the protected electronic document to the ID generator 222. As explained above with respect to ID generator 206a on client device 102a, the ID generator 222 can perform a cryptographic hash function on the protected electronic document. As mentioned above, the server data package can include the type of cryptographic hash function used to generate the client-generated ID element. Alternatively, the tracking server 108 and the client application 202a can simply be coordinated to perform the same hash function. Regardless of the method, the ID generator 222 can create a server-generated ID element for the protected electronic document.

The ID generator 222 can provide the ID element to the communication manager 220 to send to client device 102a for verification. For example, in one or more embodiments, the communication manager 220 sends the server-generated ID element to the client device 102a. As briefly mentioned above, the client application 202a can include a verifier 210a, as illustrated in FIG. 2. The verifier 210a can provide a comparison analysis between the client-generated ID element and the server-generated ID element. For example, the verifier 210a can lookup the client-generated ID element in the ID element data 216a of storage manager 212a to compare to the received server-generated ID element.

In one or more embodiments, the verifier 210 can provide a visual comparison of the client-generated ID element and the server-generated ID element on the client device 102a. In such an embodiment, the user can visually compare the two ID elements, and confirm (e.g., by selecting a confirmation button on a graphical user interface) that the two ID elements match. A visual confirmation can act as a user attestation of the integrity of the protected electronic document uploaded to the tracking server 108. Alternatively, the verifier 210 can run a comparison function on the client-generated ID element and the server-generated ID element to determine if there is a match between the two ID elements.

In the event that the verifier 210a determines that the client-generated ID element for the protected electronic document does not match the server-generated ID element, the verifier 210a can cause an error message to be sent to the tracking server 108. The event recorder 226 on the tracking server can record a verification error event on the event log 232. In one or more embodiments, the error message can cause the tracking server 108 to delete or otherwise erase the unverified protected electronic document from the tracking server 108.

In addition, the verifier 210a can cause the client device 202a to alert the originating user 104 that a verification error has occurred. Due to the fact that a failed verification between the client-generated ID element and the server-generated ID element indicates a potential breach in the integrity of the electronic document, the client application 202a can delete the protected electronic document, the key, and the ID element, and prompt the user to start the process anew. Alternatively, the client application 202a can prompt the user to create a new client generated ID on the protected document, and attempt to verify the protected electronic document again with the tracking server 108.

In one or more embodiments that include the above described verification process, the client device 102a can send the server data package prior to sending a communication to the one or more participating users 106. Sending the server data package to the tracking server 108 first allows the client device 102a to verify the contents of the protected electronic document on the tracking server 108 prior to sending out the key to the participating users 106. Therefore, in the event that the verifier 210a cannot verify the protected electronic document, the client device 202a does not send the key to the one or more participating users 106. In other words, in one or more embodiments, the client device 102a does not send out the key to the one or more participating users 106 until the verifier 210a can verify the tracking server 108 has properly received the protected electronic document.

When the client-generated ID element matches the server-generated ID element, the client application 202a can provide a verification indication to the originating user 104 that signals to the originating user 104 that the process is complete and successful. Furthermore, the client application 202a can send a verification message back to the tracking server 108, and the event recorder 226 on the tracking server 108 can enter the verification event in the event log 232. In addition, the tracking server 108 can store the protected electronic document in protected data 230 within the database 228, as illustrated in FIG. 2.

As further illustrated in FIG. 2, the tracking server 108 can include a review organizer 224. In one or more embodiments, the review organizer 224 can facilitate an electronic signature process for the electronic document. In one or more embodiments, the review organizer 224 can implement a pull review process for the electronic document. In particular, when the order of review is not important, the review organizer 224 can send an invite message to each of the participating users 106 at substantially the same time, and each of the participating users 106 can access, review, and sign the electronic document in any order.

To prevent inadvertent creation of conflicting copies of the protected electronic document in a pull review process, the review organizer 224 can limit the review process to only allow one participating user 106 at a time. For example, the review organizer 224 can detect when the last event related to the protected electronic document is a "sent" event. A "sent" last event indicates that a participating user is currently reviewing the protected electronic document. If the review organizer 224 receives a second request to review the same protected electronic document when the last event is a "sent" event, the review organizer 224 can deny the request and send an explanation message back to the participating user 106 that made the second request.

In one or more additional embodiments, the review organizer 224 can implement a push review process for the electronic document. For example, the review organizer 224 can coordinate the timing and order of the signatories reviewing and signing the electronic document. In other words, the review organizer 224 can send an invite message to each of the participating users 106 to access and sign the electronic document one participant user 106 at a time to create a signature order. The originating user 104 may set the signature order at the time the originating user 104 identifies the participating users 106.

Regardless of the specific review process, the review organizer 224 can implement a notification process for the one or more participating users 106. For example, referring back to FIG. 2, the review organizer 224 can access the list of user IDs included in the server data package. Moreover, the review organizer 224 can create and send an invite message through the network 110 to the client device 102b inviting the participating user 106a to review the document. In one example embodiment, the invite message is an email. In alternative embodiments, however, the invite message can be any form of electronic communication.

The invite message can include one or more items to allow the participating user 106 to review the electronic document. For example, the invite message may include the originating user's 104 identity, a custom message from the originating user 104, and a URL link to access the protected electronic document, and one or more selectable options for providing an electronic signature. In addition, the review organizer 224 can set and include a time period within the invite message. The time period can represent an amount of time in which the participating user has to access the system 100 to review and sign the electronic document. Upon expiration of the time period, without the participating user 106 accessing the system 100, the URL link may deactivate and the review organizer 224 may send an invite message to another participating user 106.

As mentioned above, the review organizer 224 can generate a URL link that the participating user 106 can select to access the protected electronic document. In one or more embodiments, the URL link is specifically associated with a particular participating user that allows the review organizer 224, and thus the event recorder 226, to detect which user requested the protected electronic document. In addition, the URL link can be a one-time-use link, meaning, that once the participating user accesses the protected electronic document, the URL link expires. A one-time-use link allows the review organizer 224 to maintain control of the review process, for example, by only activating one URL link at a time.

After the tracking server 108 sends the invite message to the client device 102b, the participating user 106 can review and sign the electronic document. In particular, the participating user 106 can select the URL link in the invite message. Upon selecting the URL link, the client device 102b sends a request to access the protected electronic document. In response, the tracking server 108 can send the protected electronic document to the client device 102b, and the event recorder 226 enters the sending of the protected electronic document in the event log 232.

As described in detail above, the client device 102b can perform a verification process on the received protected electronic file to ensure that the document was not altered between the tracking server 108 and the client device 102b. For example, the ID generator 206b can generate a client-generated ID element and send the client-generated ID element to the tracking server 108. The tracking server 108 can compare the server-generated ID element to the client-generated ID element and determine if they match. When the ID elements match, the tracking server 108 can return a verification message, when the ID elements do not match, the tracking server 108 can return an error message, similar to the verification process described above.

To gain access to the contents of the protected electronic document, the participating user 106 can locate the key to unprotect the protected document. In particular, the participating user 106 can access the key sent from the originating user 104. For example, the key may be stored in the key data 218b in storage manager 212b. The document protector 204b can use the key to decrypt or otherwise unprotect the protected electronic document, providing the participating user 106 with access to the contents of the electronic document on the client device 102b. Thus, the system 100 can provide the participating user 106 with access to the contents of the electronic document, while not allowing the tracking server 108 to have access to the contents.

The participating client 106 can review and sign the electronic document. In one or more embodiments, the participating user 106 can sign the electronic document digitally using an electronic or digital signature. One skilled in the art will appreciate the various ways in which the participating user 106 can sign the electronic document. Once the participating user is finished with reviewing and signing the electronic document, the participating user 106 can save the signed version of the electronic document on the client device 102b in preparation to send a signed protected electronic document to the tracking server 108. In additional or alternative embodiments, the participating user 106 can provide an electronic signature separate from the electronic document (i.e., without modifying the electronic document itself). Accordingly, the version of the electronic document stored by the tracking server 108 remains unchanged and the tracking server 108 can store the data representative of the electronic signature in associated with the stored electronic document.

The client application 202b can allow the participating user 106 to protect and send a signed version of the electronic document to the tracking server 108 using a process similar to those explained in more detail above. For example, document protector 204b can protect the electronic document by encryption. In one or more example embodiments, the document protector 204b can use the same key that was originally sent from the originating user 104 to the participating user 106. Alternatively, the document protector 204b can use a new key to encrypt the electronic document. If a new key is used, however, the participating user 106 would then need to take an additional step to send out the new key to each of the users that would need access to the updated version of the protected electronic document.

In addition, the ID generator 206b can generate an ID element for the signed protected electronic document. As discussed in detail above, the ID generator 206b can calculate a cryptographic hash on the signed protected electronic document to generate a client-generated ID element. In one or more embodiments, the client-generated ID element for the signed protected electronic document is different than the original client-generated ID element generated at the originating user's 104 client device 102a. This is because the content of the electronic document may have changed due to the participating user's signature.

Alternatively, depending on the file structure of the electronic document, the participating user 106 can use a digital signature without changing the content of the original electronic document. For example, a client application such as ADOBE ACROBAT can use the PDF file structure to apply a digital signature in an incremental save. In particular, due to the file structure of a PDF document, when the participating user 106 digitally signs the electronic document and subsequently saves the electronic document, the original content of the electronic document is not actually saved again. Rather, the digital signature is saved as an incremental save (or an append) to the electronic document, while the original content (e.g., the leading edge of the file structure) remains identical and is not changed by the incremental save. Thus, for a PDF (or similar) file structure, an ID element can be generated for both the entire document (e.g., the leading edge plus the append) as well as the leading edge alone and/or the append alone.

In one example embodiment, all or a portion of the system 100 can be provided using a sign-on service, such as ADOBE.COM. For example, a user of the sign-on service can have a registered sign-on ID that is associated with a public key certificate/private key certificate that the user can use to digitally sign a document. The public key certificates provided by the sign-on service can be combined with the PDF file structure to provide a process by which a user can select the participating users which can access the protected document (e.g., provide a way in which a key is assigned, or multiple keys are assigned to a protected document).

For example, a user can encrypt a document having a PDF file structure using a certificate-based encryption mode. A certificate-based encryption allows a user to encrypt a document that contains data derived from all of the public key certificates of all of the users allowed to view the document. In particular, the sign-on service can prompt the originating user 104 to select one or more participating users 106 that are allowed to view the document. The sign-on service then associates data derived from all of the public key certificates for each of the selected participating users 106, and/or the originating user 104, with the document. For example, the public key certificates can be saved in the append portion of the PDF file structure, while the document is saved to the leading edge of the file structure.

The sign-on service can then allow the originating user 104 to save the protected document, and the user can send the protected document to the tracking server 108. The tracking server 108 can invite each participating user 106 to view the protected document, as described herein, and each user then uses their private key certificate to open the protected document. After opening the document, each of the users can digitally sign the document. The digital signature of each user can be saved within an append portion of the file structure (e.g., each digital signature can be saved within different append portions), while the base document remains unchanged.

In one or more embodiments, when a PDF file structure is used, the digital signature of the participating user may be unprotected. In other words, the original electronic document (e.g., the leading edge) is encrypted while the digital signature (e.g., the append) is not encrypted. In such an embodiment, the digital signature can be stored in an unprotected state on the tracking server 108, while the electronic document is always stored in a protected state. Thus, even without the key, a user could identify which users had signed the electronic document, although without a key the user would not be able to access the contents of the electronic document.

Continuing, participating user 106 can proceed to provide the signed protected electronic document to the tracking server 108. For example, the communication manager 208b can send a server data packet including the signed protected electronic document to the tracking server 108. As mentioned above, the invite message can include a URL link that the participating user 106 can click on to submit the signed protected electronic document to the tracking server 108. Alternatively, the participating user 106 can simply select a send button within the client application 202b that is mapped to the URL link, as will be explained further below with reference to FIGS. 4A-4B.

The tracking server 108 can initiate the verification process by calculating a server-generated ID element for the signed protected electronic document, and sending the server-generated ID element to the client device 102b. The verifier 210b can compare the client-generated ID element and the server-generated ID element for a match, and cause the client device 202b to display and send a verification message, or error message, based on the results of the comparison, as explained above in detail.

The act of sending the signed protected electronic document to the tracking server 108 can constitute providing a signature. For example, upon the tracking server 108 receiving the signed protected electronic document, the event recorder 226 can record the receipt of the signed protected electronic document, along with the verified ID element, and other details relating to receiving the signed protected electronic document, which can be recognized as providing a signature.

Moreover, the review organizer 224 can send a notification to the originating user 104 and/or each of the participating users 106 that the participating user 106 has signed the document. In this way, the review organizer 224 can send out updates of the signature process to the originating user 104 and/or each of the participating users 106. Not only can the review organizer 224 send out notifications regarding received signed protected electronic documents, but the review organizer 224 can send out updates to the originating user 104 and/or one or more of the participating users 106 regarding any event related to the protected electronic document.

In addition, upon receiving a signature from one participating user 106, the review organizer 224 can move to the next stage of the review process. For example, if there is more than one participating user 106, the review organizer 224 can send an invite message to the next participating user 106. The next participating user 106 then completes a similar process as described above. Upon receiving a signature from each participating user 106 that the originating user 104 identified, the review organizer 224 can send a notification to the originating user 104 and/or one or more participating users 106 indicating that the signature process is complete.

Figures 3A, 3B:
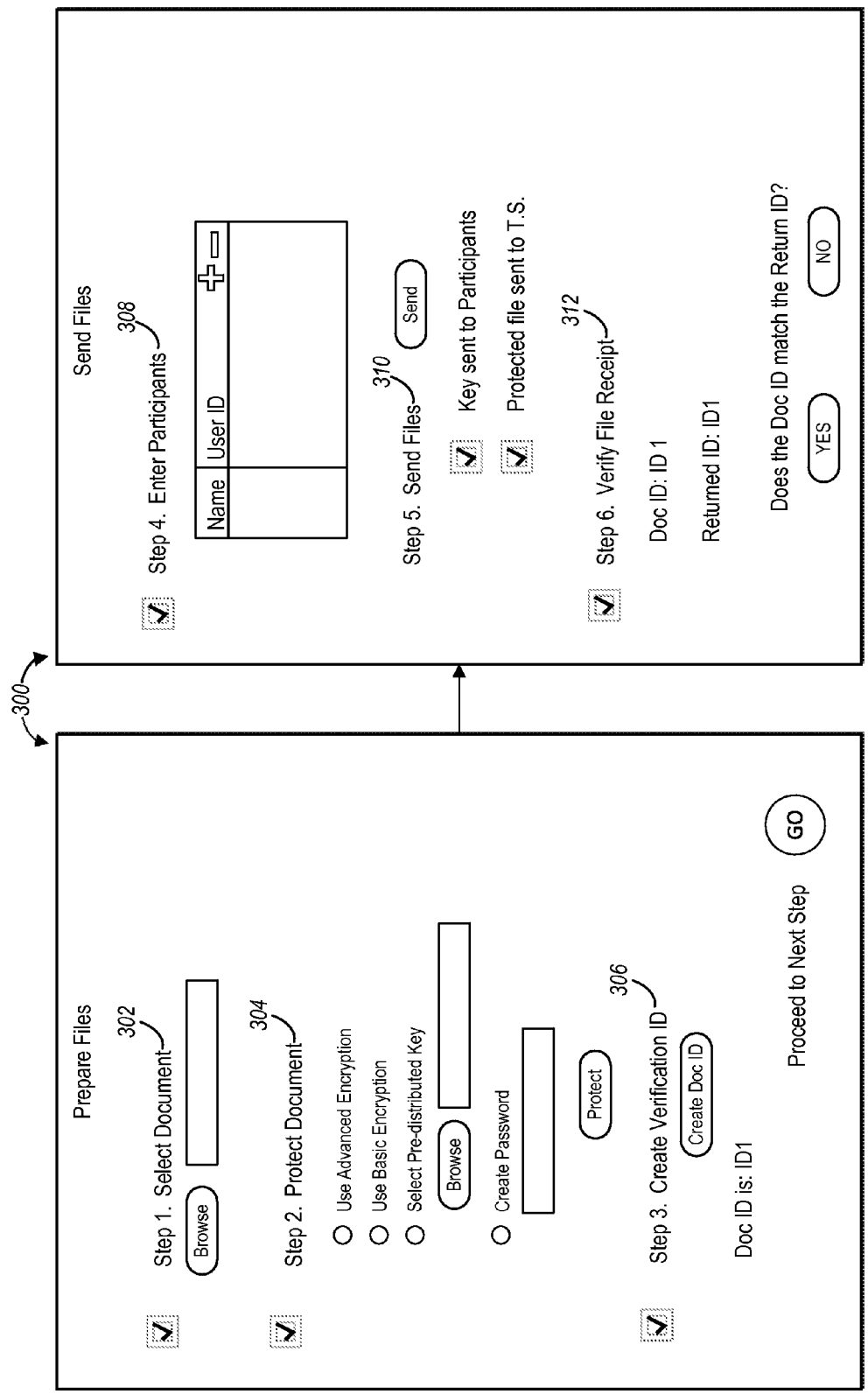
FIG. 3A-3B illustrates a graphical user interface of an electronic document signature system application in accordance with one or more embodiments.

In addition to the above functionality, one or more embodiments can include providing a graphical user interface that can facilitate one or more of the above features, processes, methods, and results. For example, the client application 202a, 202b, or tracking server 108 can provide a graphical user interface that easily allows the originating user 104 and the participating user 106 to use the system 100. For example, FIGS. 3A-3B illustrate example screen views of an example graphical user interface 300 used to introduce an electronic document into the system 100. As illustrated in FIGS. 3A-3B, the graphical user interface can provide a process flow to the originating user 104 to allow use of the system 100. Although the graphical user interface 300 includes a particular number of steps, it should be appreciated that one or more steps can be combined, separated, or removed.

In addition to the various steps the graphical user interface 300 can include, the graphical user interface 300 can also include various screen views. For example, FIGS. 3A-3B illustrate that the graphical user interface can include two screen views. Alternatively, the graphical user interface 300 can include a screen view for each step presented. In another example embodiment, the entire graphical user interface 300 can be presented in a single screen view. In addition, and as described above, each of the steps illustrated in FIGS. 3A-3B may be presented using one or more different client applications.

FIG. 3A illustrates that the graphical user interface 300 can include one or more graphical object elements to facilitate a document selection step 302. As illustrated, the graphical user interface can include a browse button that allows the originating user 104 to search for and locate an electronic document that the originating user 104 wants to share and track using system 100. In addition, the graphical user interface 300 can include a fillable directory path field that is populated upon the originating user 104 browsing and selecting an electronic document, or alternatively, the originating user 104 can enter the directory path and file name directly in the directory path field. Once the electronic document is properly located, the graphical user interface 300 can provide a completed check next to the document selection step 302, as shown in FIG. 3A.

In one or more embodiments, the document selection process is used to select an electronic document that has already been protected. For example, a user can use a first client application to protect an electronic document, and then use the graphical user interface 300 to select the protected electronic document. Alternatively, the graphical user interface can include one or more graphical object elements to facilitate a document protection step 304. As illustrated in FIG. 3A, the graphical user interface related to the document protection step 304 can include one or more options for protecting the document.

In particular, and as explained in detail above, the originating user 104 can select one or more options related to the method the client application 202a uses to encrypt the electronic document. As shown in FIG. 3A, the originating user 104 can select between an advanced encryption option, a basic encryption option, a pre-distributed key, or create a custom password. The graphical user interface 300 can also include additional encryption options, depending on the particular application of the system 100.

Upon the originating user 104 selecting a protection option (e.g., by selecting a radial button), the originating user 104 can select the protect button, as illustrated in the document protection step 304. In response to the originating user 104 selecting the protect button, the client application 202a performs the chosen encryption method on the selected document. The graphical user interface 300 can indicate the successful completion of protecting the electronic document by providing a completed check next to the document protection step 304, as illustrated in FIG. 3A.

After the electronic document is protected, the graphical user interface 300 can provide one or more graphical object elements to facilitate a document ID creation step 306, as illustrated in FIG. 3A. As illustrated, the graphical user interface 300 can facilitate the document ID creation step 306 with a button. Upon selecting the button on the graphical user interface 100, the client application 202a can perform a hash function on the protected electronic document to create the ID element, as described above. The graphical user interface 300 can further present the document ID element once it is created, as illustrated in FIG. 3A. For simplicity, the document ID (e.g., ID element) is illustrated as "ID1." Additionally, the graphical user interface 300 can indicate the successful completion of creating an ID element by providing a completed check next to the document ID creation step 306, as illustrated in FIG. 3A.

Upon completion of the document ID creation step 306, the graphical user interface 300 has facilitated the preparation of the necessary data regarding the electronic document. Thus, the graphical user interface 300 can include a graphical object element that indicates to the user to proceed to the next step. For example, as illustrated in FIG. 3A, the graphical user interface 300 can include a "Go" button to prompt the user to move on to the next step of the process. Upon detecting a user interaction with the "Go" button, the graphical user interface 300 can provide a second screen view, as illustrated in FIG. 3B.

As FIG. 3B illustrates, the graphical user interface 300 can include one or more graphical object elements to facilitate a participant user entry step 308. For example, the graphical user interface 300 can include a data entry field that allows the originating user 104 to provide the identities of one or more participating users that the originating user 104 wants to review the electronic document. For example, as illustrated in FIG. 3B, the originating user 104 can provide the name and/or user ID of one or more participating users. In one or more embodiments, the graphical user interface 300 can facilitate a selection of one or more participant users from one or more contacts lists. The graphical user interface 300 can indicate the successful completion of entering at least one valid participating user by providing a completed check next to the participant user entry step 308, as illustrated in FIG. 3B.

Upon detecting the entry of one or more valid participant users, the graphical user interface can provide one or more graphical object elements to facilitate a sending step 310 that sends files to both the participating users 106 as well as the tracking server 108. For example, as illustrated in FIG. 3B, the graphical user interface 300 can include a "Send" button as part of the sending step 310. For example, upon detecting the selection of the "Send" button, the client application 202a can send the key to the one or more participating users 106 and the server data package to the tracking server 108, as described in detail above. The graphical user interface 300 can indicate the successful completion of the sending step 310 by providing a completed check next to the sending step 310, as illustrated in FIG. 3B.

Subsequent to the sending step 310, the graphical user interface 300 can provide one or more graphical object elements to facilitate a verification step 312 that allows the originating user 104 to verify that the tracking server 108 received the correct version of the protected electronic document. For example, and as illustrated in FIG. 3B, the graphical user interface 300 can include a data box for the client-generated ID element and the server-generated ID element. In addition, the graphical user interface 300 can include confirmation buttons that allow the user to confirm that the ID elements match. In one or more alternative embodiments, the verification step 312 can simply include a "Success" message or an "Error" message as the client application 202a may automatically compare and the ID elements, as discussed above.

Figures 4A, 4B:
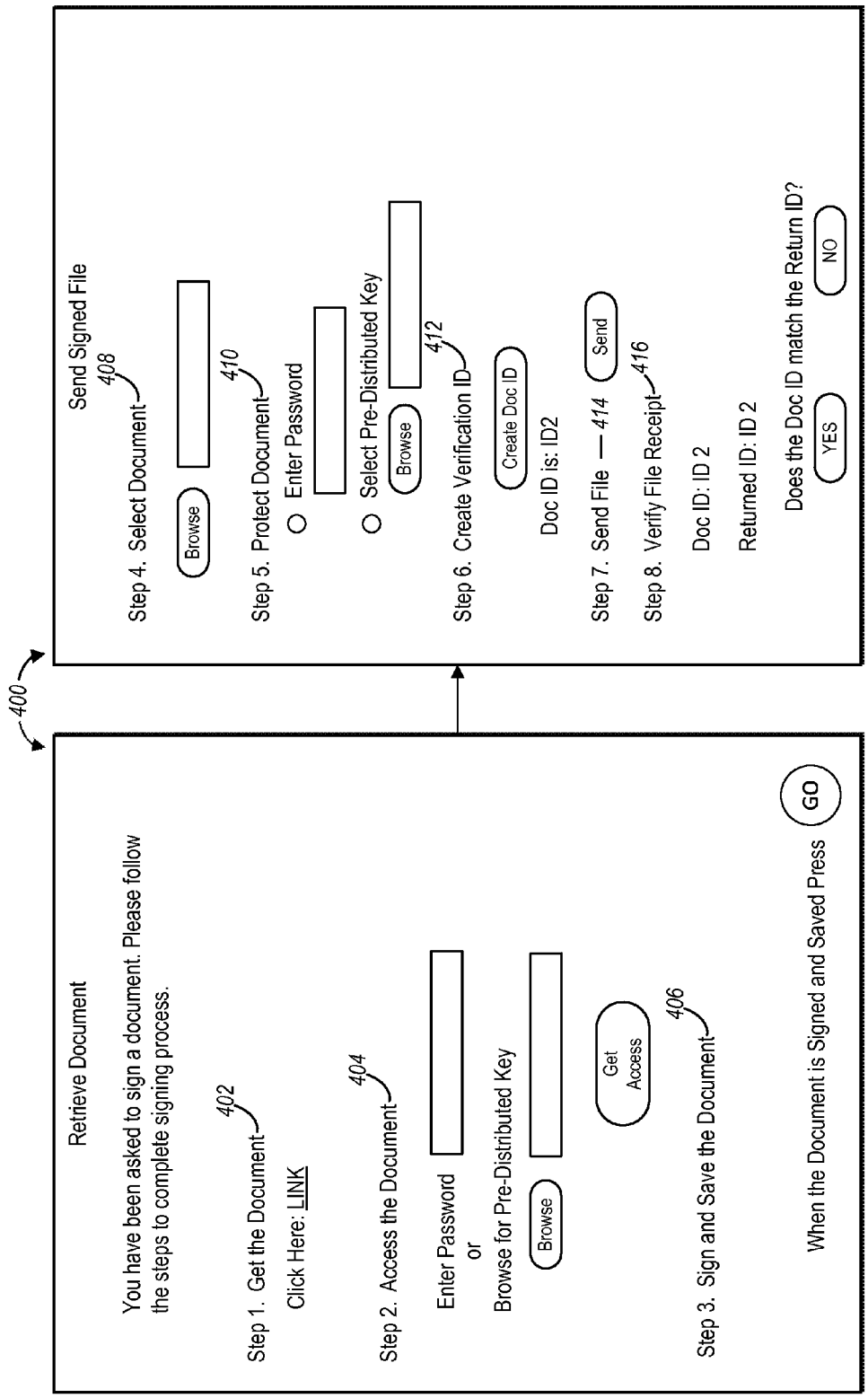
FIG. 4A-4B illustrates another graphical user interface of an electronic document signature system application in accordance with one or more embodiments

One or more embodiments of the system 100 can further include a client application 202b that provides a graphical user interface 400 for use by a participating user 106. For example, FIGS. 4A-4B illustrate a graphical user interface 400 that can facilitate a participating user 106 reviewing and signing the electronic document. For example, the graphical user interface 400 can include one or more graphical object elements that facilitate a document-receiving step 402, as illustrated in FIG. 4A. In particular, the graphical user interface 400 can include a link that points to the location of the protected electronic document on the tracking server 108. Upon the participating user selecting the link, the protected electronic document can be provided to the client device 102b.

In addition, the graphical user interface 400 can include one or more graphical object elements that facilitate a document access step 404, as illustrated in FIG. 4A. For example, the graphical user interface 400 can include a data entry box where the participating user 106 can enter in a password associated with the protected electronic document. Furthermore, the graphical user interface can include a browse option to allow the participating user 106 to locate a key file on the client device associated with the protected electronic document. The graphical user interface 400 can further include a "Get Access" button that facilitates decryption of the protected electronic document with the key.

In one or more embodiments, upon the user selecting the "Get Access" button, the client application 102b decrypts the protected electronic document and opens the electronic document. As illustrated in FIG. 3A, the graphical user interface can present a sign step 406 that instructs the participating user to sign the electronic document and save the electronic document, or otherwise provide an electronic signature for the electronic document. Once the user has signed the electronic document, the graphical user interface 400 can include a "Go" button that facilitates the presentation of the next steps of the signature process. For example, upon detecting a user interaction with the "Go" button, the client application 202b can present a second screen view, as illustrated in FIG. 4B.

FIG. 4B illustrates that the graphical user interface 400 can further include one or more graphical object elements that facilitate an updated document selection step 408, an updated document protection step 410, an updated document ID creation step 412, an updated document sending step 414, and an updated document verification step 416. Steps 408-416 can include similar features and characteristics as described above with reference to FIGS. 3A-3B and the corresponding steps with respect to the original electronic document.

Figure 5:
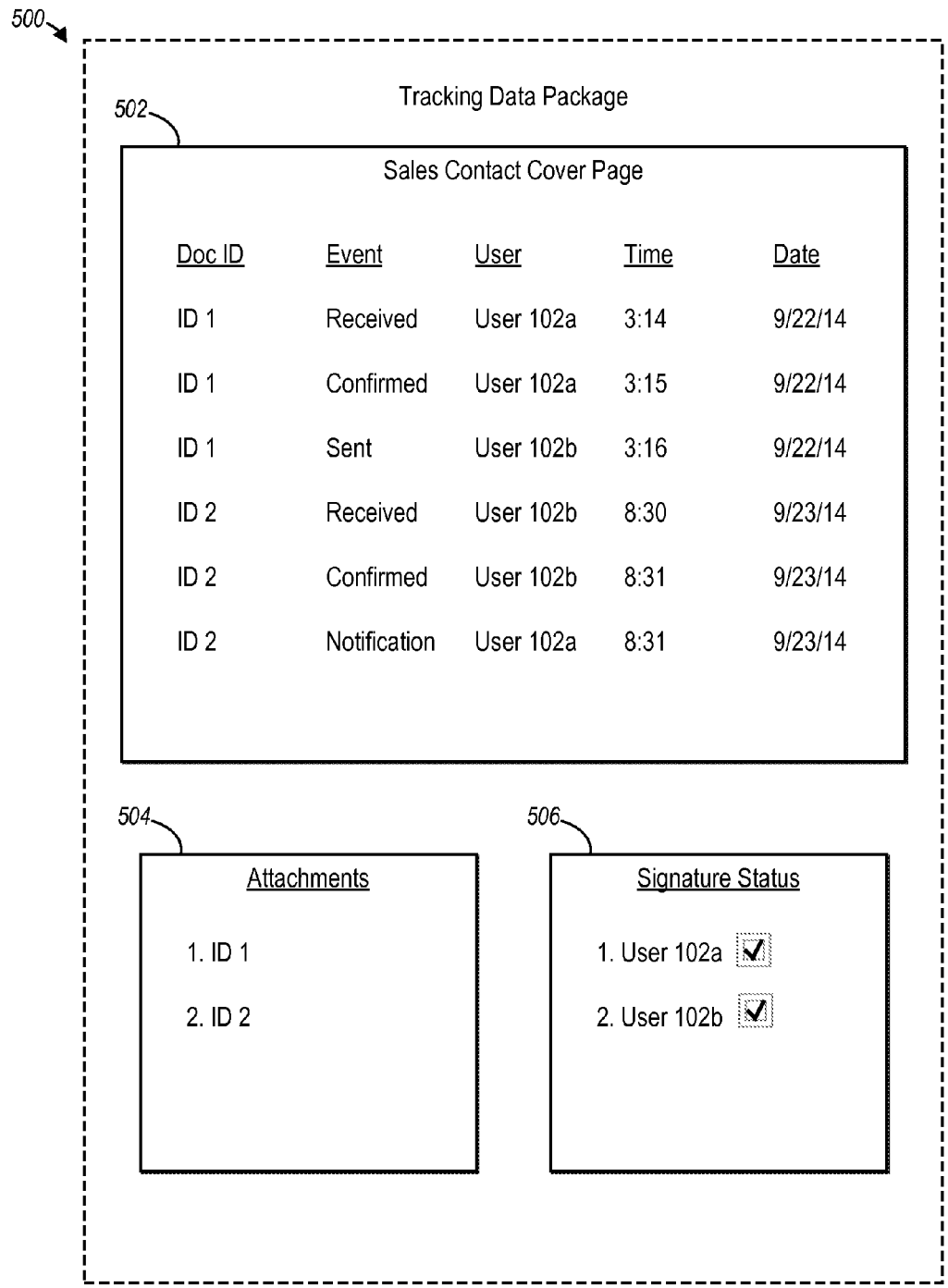
FIG. 5 illustrates a schematic representation of a data package in accordance with one or more embodiments.

In addition to the various graphical user interfaces that facilitate the use of system 100, one or more embodiments of the system 100 can create various data packages and/or reports that allows users of the system 100 to easily view and understand the tracking data associated with one or more signed documents. For example, FIG. 5 illustrates a schematic diagram of a data package 500 that the tracking server 108 can provide to a user. In particular, the data package 500 can include a cover page 502. For instance, as illustrated in FIG. 5, the cover page 502 can include an event log, or a summary of an event log (such as even log 232). As shown, the cover page 502 can include a listing of events associated with a particular electronic document, in this case a Sales Contract. In one or more embodiments, the user can select the types of events to include on the cover page 502. As illustrated, the cover page 502 can include each time a document is received at, or sent from, the tracking server 108.

Each event listed can include one or more details relating to each event. For example, as illustrated in FIG. 5, each event can include the ID element of the document received (e.g., Doc ID), a description of the event, the user associated with the event, a time of day the event occurred, and a date the event occurred. The cover sheet 502 can allow a user to verify each of the events related to the electronic document. In alternative embodiments, the details listed for each event can vary and can be set as a user preference within the system 100.

In addition to the cover page 502, the tracking data package 500 can further include one or more attachments 504. As illustrated in FIG. 5, the attachments 504 can include one or more versions of protected electronic documents. For example, FIG. 5 illustrates that the attachments include two versions of the protected electronic document, ID 1 and ID 2, which correspond to the original protected electronic document and the signed protected electronic document. The user can then use the key created during the tracking process to access the contents of each attachment.

The tracking data package 500 can also include a signature status summary. For example, as illustrated in FIG. 5, the signature status can indicate which users have signed the document. For example, FIG. 5 illustrates that users 102a and 102b have both signed the electronic document. The signature status, therefore, can provide a very quick way for a user to know which of the participating users has signed the document, and which of the participating users have not signed the document.

Notwithstanding the tracking data package 500 illustrated in FIG. 5, the system 100 can provide various other reports and information to a user. For example, a particular user may have hundreds of documents that are tracked using the system 100. The system 100 can provide one or more aggregate reports that contain the number of documents on the system 100, the status of each of the documents, or other information. Moreover, in one or more embodiments, the system 100 can provide notifications to a particular user server for each event that occurs. Thus, a user can access the aggregate events, or the latest event, for each of the documents on the system 100 to quickly know the status of a particular document, or for multiple documents.

Figure 6:
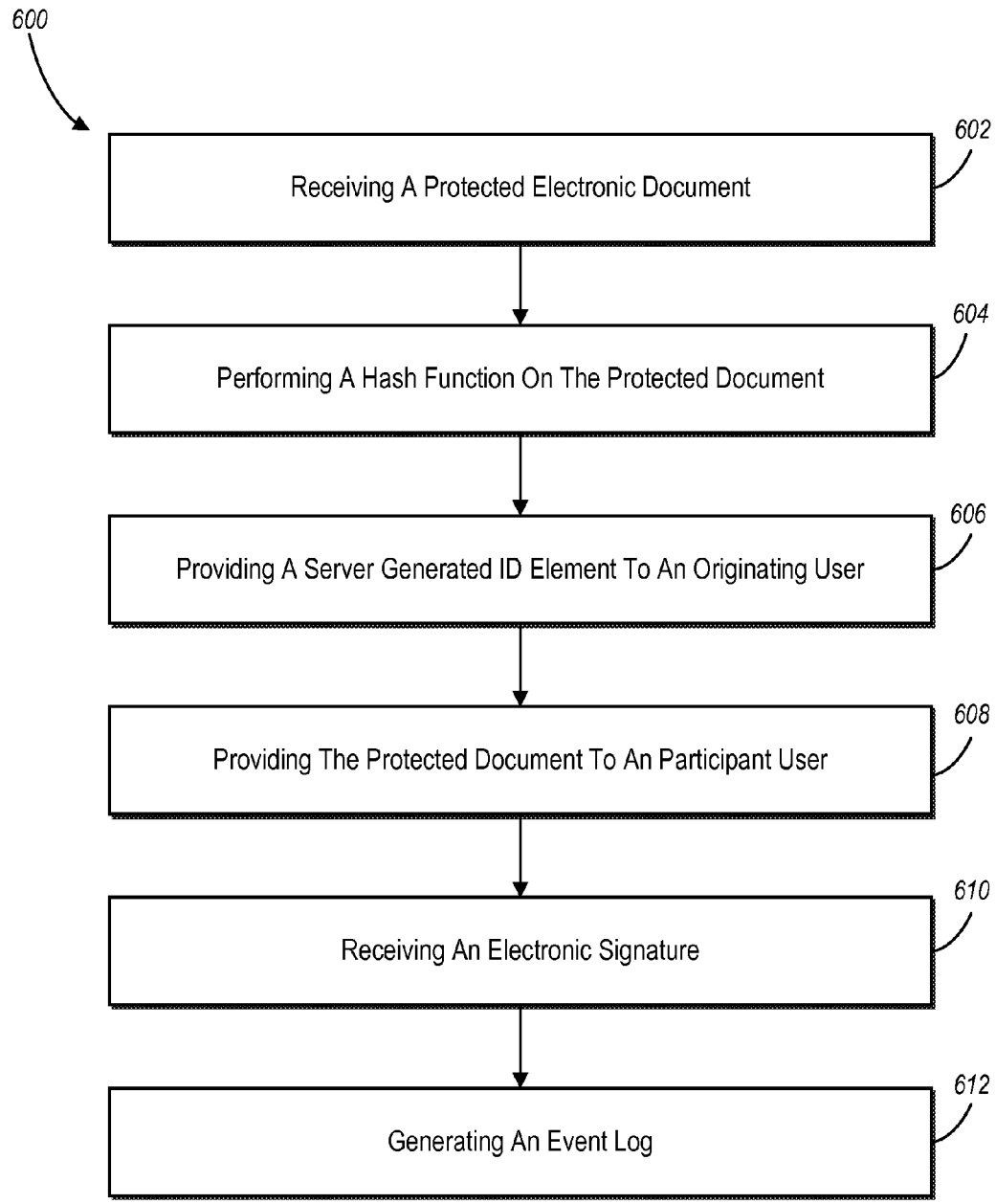
FIG. 6 illustrates a flowchart of a series of acts in a method of tracking an electronic document in accordance with one or more embodiments.
Figure 7:
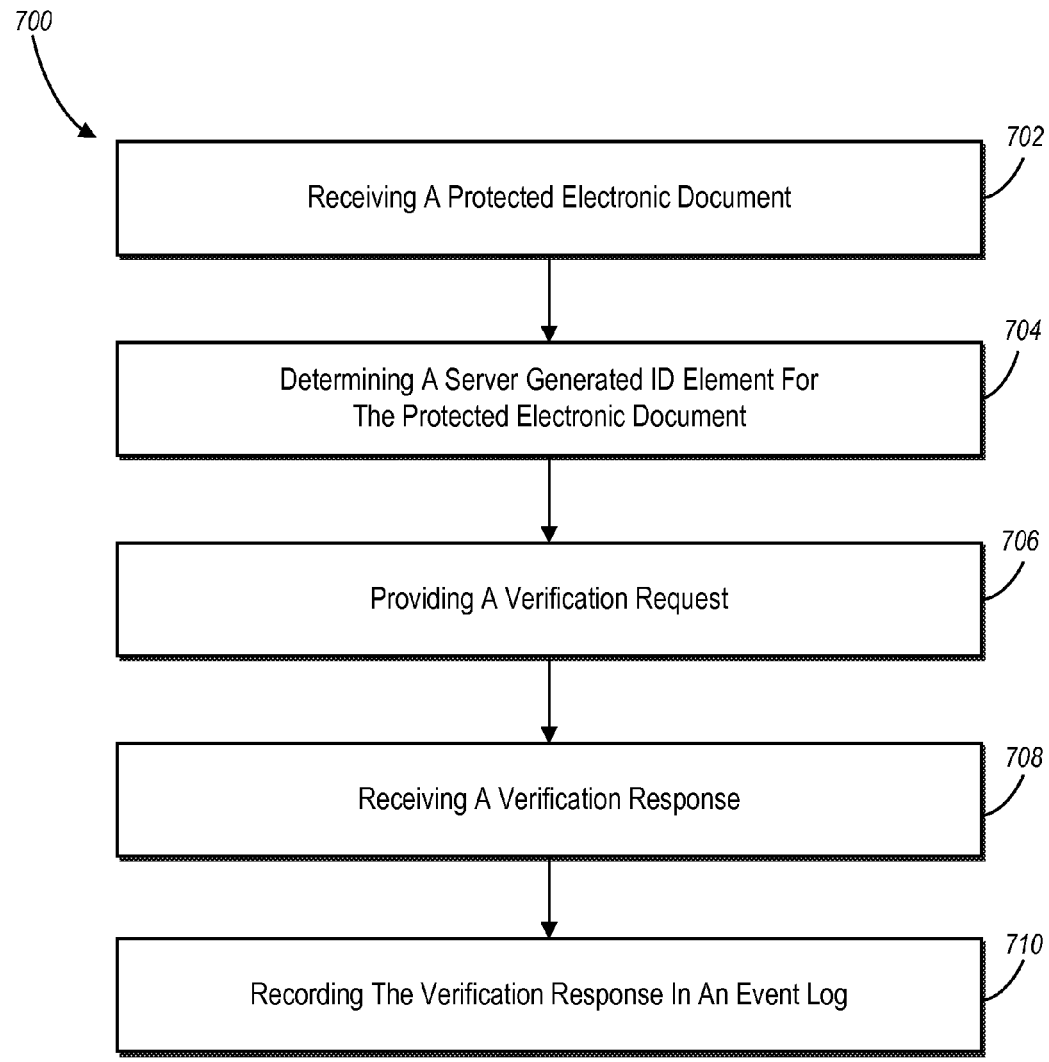
FIG. 7 illustrates a flowchart of a series of acts in a method of tracking an electronic document in accordance with one or more embodiments.

FIGS. 1-5, the corresponding text, and the examples, provide a number of different systems and devices for managing an electronic document signature system. In addition to the foregoing, embodiments also can be described in terms of flowcharts comprising acts and steps in a method for accomplishing a particular result. For example, FIGS. 6 and 7 illustrate flowcharts of exemplary methods in accordance with one or more embodiments. The methods described in relation to FIGS. 6 and 7 may be performed with less or more steps/acts or the steps/acts may be performed in differing orders. Additionally, the steps/acts described herein may be repeated or performed in parallel with one another or in parallel with different instances of the same or similar steps/acts.

Referring to FIG. 6, the method 600 includes an act 602 of receiving a protected document. In particular, act 602 can include receiving, by at least one server device and from a client device 102 corresponding to an originating user 104, a protected electronic document and a user identity of a participant user 106, wherein the content of the protected electronic document is inaccessible by the at least one server device. For example, the client device 102a can protect an electronic document and send the protected electronic document to the tracking server 108.

The method 600 further includes an act 604 of performing a hash function on the protected electronic document. In particular, act 604 can include performing, by the at least one server device, a hash function on the protected electronic document to generate a server-generated ID element. As described above, tracking server 108 can include ID generator 222. ID generator 22 can perform a hash function to obtain a hash value that can be used as the server-generated ID element.

Method 600 can further include an act 606 of providing the server-generated ID element to an originating user. For example, act 606 can include providing the server-generated ID element to the originating user 104 for verification that the server-generated ID element matches a client-generated ID element generated at the client device 102a. As described above, the client device 102a can obtain a client-generated ID element using ID generator 206a, and the verifier 201a can verify that the server-generated ID element matches the client-generated ID element.

Method 600 can also include an act 608 of providing the protected document to a participant user. For example, act 608 can include providing the protected electronic document to a client device 102 corresponding to the participant user 106. In particular, act 608 can include the review organizer 224 scheduling the sending of notifications to one or more participant users 106 provided to the tracking server 108. For example, the review organizer 224 can cause an email message with a link to be sent the participating user 106, the link allowing the participant user 106 to access the protected document and have the tracking server 108 send the protected document to the client device 102b corresponding to the participating user 106.

Method 600 can further include an act 610 of receiving an electronic signature. For example, act 610 can include receiving an electronic signature from the participant user 106. In one or more embodiments, the participant user 106 can decrypt the protected document, sign the electronic document, protect the signed electronic document, and then send the protected signed electronic document to the tracking server 108 using the client application 202b on the client device 102b. Alternatively, the participant user 106 can send a digital signature to the tracking server 108 in any other suitable manner.

Method 600 can further include an act 612 of generating an event log. In particular, act 612 can include generating an event log associated with the protected electronic document, the event log comprising information associated with the received electronic signature. For example, the event recorder 226 can track receiving the signed protected document, the user that sent the signed protected document, the generation of an ID element for the signed protected document, and/or the verification of the ID element for the signed protected document in the event log. In addition, the event recorder can track a digital signature provided by one or more participating users 106.

Referring now to FIG. 7, method 700 can include an act 702 of receiving a protected electronic document. For example, act 702 can include receiving, by at least one server device, a protected electronic document from a client device 102a corresponding to an originating user 104, wherein the contents of the protected electronic document are inaccessible by the at least one server device. For example, the client device 102a can protect an electronic document and send the protected electronic document to the tracking server 108.

Method 700 can further include an act 704 of determining a server-generated ID element for the protected electronic document. In particular, act 704 can include determining, by the at least one server device, a server-generated ID element for the protected electronic document. For example, the tracking server 108 can include an ID generator 222 that performs a hash function on the protected electronic document to obtain the server-generated ID element.

Method 700 can further include an act 706 of providing a verification request. For example, act 706 can include providing, to the client device 102a, a verification request that includes the server-generated ID element. For example, tracking server 108 can send the verification request to the client device 102a. The client device 102a can include a verifier 210a that can verify the server-generated ID element matches a client-generated ID element.

Additionally, method 700 can include an act 708 of receiving a verification response. In particular, act 708 can include receiving, from the client device 102a, a verification response indicating that the server-generated ID element matches a client-generated ID element generated by the client device for the protected electronic document. For example, client device 102a can send a verification message to the tracking server 108 that indicates that the client-generated ID element matches the server-generated ID element.

Method 700 can further include an act 710 of recording the verification response in an event log. For example, the act 710 can including recording the verification response in an event log associated with the protected electronic document. For example, the event recorder 226 can record a verification that the server-generated ID element corresponds to the protected document sent by the originating user 104 in the event log.

One or more embodiments may comprise or utilize a special purpose or general-purpose computer including computer hardware, such as, for example, one or more processors and system memory, as discussed in greater detail below. One or more embodiments also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be implemented in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the electronic document signature system. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the principles described herein may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The principles described herein may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
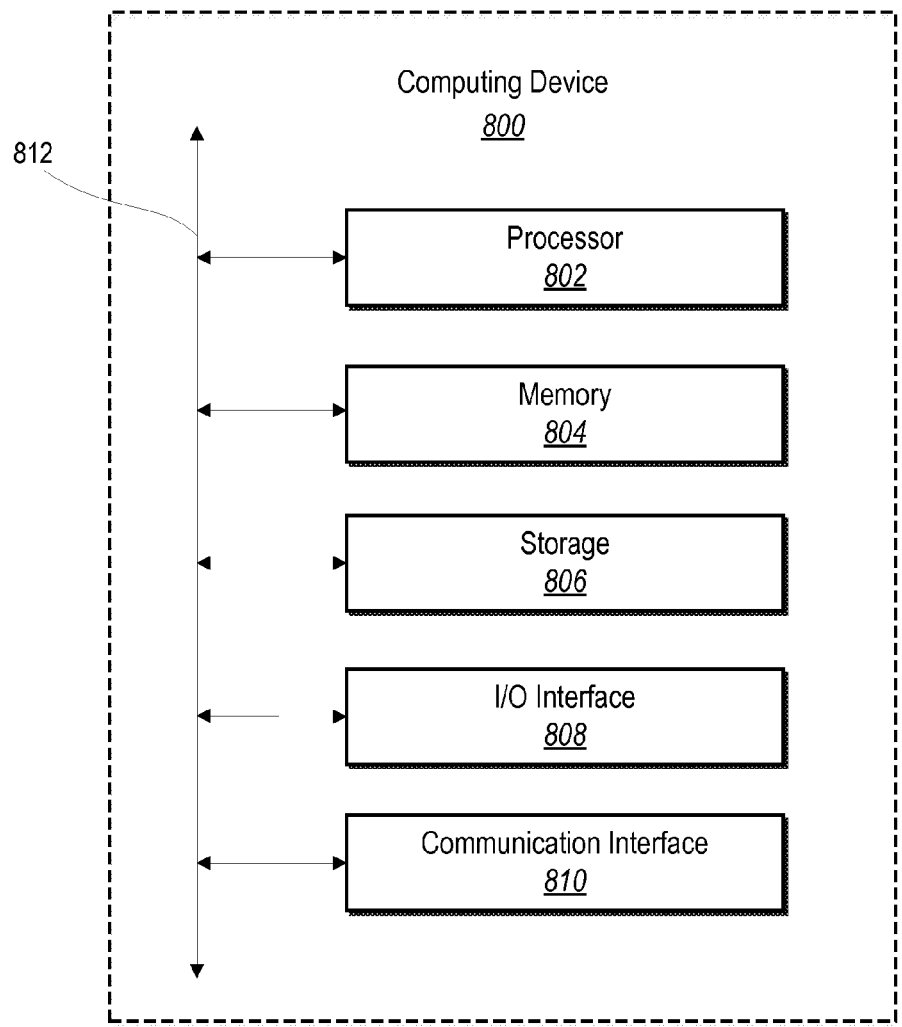
FIG. 8 illustrates a block diagram of an exemplary computing device in accordance with one or more embodiments.

FIG. 8 illustrates, in block diagram form, an exemplary computing device 800 that may be configured to perform one or more of the processes described above. One will appreciate that the client 102 (or even the database system 100) can comprise implementations of the computing device 800. As shown by FIG. 8, the computing device can comprise a processor 802, memory 804, a storage device 806, an I/O interface 808, and a communication interface 810. While an exemplary computing device 800 is shown in FIG. 8, the components illustrated in FIG. 8 are not intended to be limiting. Additional or alternative components may be used in other embodiments. Furthermore, in certain embodiments, a computing device 800 can include fewer components than those shown in FIG. 8. Components of computing device 800 shown in FIG. 8 will now be described in additional detail.

In particular embodiments, processor(s) 802 includes hardware for executing instructions, such as those making up a computer program. As an example and not by way of limitation, to execute instructions, processor(s) 802 may retrieve (or fetch) the instructions from an internal register, an internal cache, memory 804, or a storage device 806 and decode and execute them. In particular embodiments, processor(s) 802 may include one or more internal caches for data, instructions, or addresses. As an example and not by way of limitation, processor(s) 802 may include one or more instruction caches, one or more data caches, and one or more translation lookaside buffers (TLBs). Instructions in the instruction caches may be copies of instructions in memory 804 or storage 806.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 may be internal or distributed memory.

The computing device 800 includes a storage device 806, which includes storage for storing data or instructions. As an example and not by way of limitation, storage device 806 can comprise a non-transitory storage medium described above. The storage device 806 may include a hard disk drive (HDD), a floppy disk drive, flash memory, an optical disc, a magneto-optical disc, magnetic tape, or a Universal Serial Bus (USB) drive or a combination of two or more of these. Storage device 806 may include removable or non-removable (or fixed) media, where appropriate. Storage device 806 may be internal or external to the computing device 800. In particular embodiments, storage device 806 is non-volatile, solid-state memory. In particular embodiments, Storage device 806 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 800 also includes one or more input or output ("I/O") devices/interfaces 808, which are provided to allow a user to provide input to (such as user keystrokes), receive output from, and otherwise transfer data to and from the computing device 800. These I/O devices/interfaces 808 may include a mouse, keypad or a keyboard, a touch screen, camera, optical scanner, network interface, modem, other known I/O devices or a combination of such I/O devices/interfaces 808. The touch screen may be activated with a stylus or a finger.

The I/O devices/interfaces 808 may include one or more devices for presenting output to a user, including, but not limited to, a simple text-based terminal, a graphics engine, a display (e.g., a display screen), one or more output drivers (e.g., display drivers), a printer, one or more audio speakers, and one or more audio drivers. In certain embodiments, devices/interfaces 808 is configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 can provide one or more interfaces for communication (such as, for example, packet-based communication) between the computing device and one or more other computing devices 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 810. As an example and not by way of limitation, computing device 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 800 may include any suitable communication interface 810 for any of these networks, where appropriate.

The computing device 800 can further include a bus 812. The bus 812 can comprise hardware, software, or both that couples components of computing device 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

The foregoing specification describes one or more embodiments of a tracking system. Various embodiments and aspects of one or more embodiments are described with reference to details discussed herein, and the accompanying drawings illustrate the various embodiments. The description above and drawings are illustrative of one or more embodiments and are not to be construed as limiting the principles disclosed herein. Numerous specific details are described to provide a thorough understanding of various embodiments.

One or more additional embodiments may be embodied in other specific forms without departing from its spirit or essential characteristics. The described embodiments are to be considered in all respects only as illustrative and not restrictive. The scope is, therefore, indicated by the appended claims rather than by the foregoing description. All changes that come within the meaning and range of equivalency of the claims are to be embraced within their scope.

We claim:

1. A method of providing a secure electronic document signature service, comprising:
    receiving, by at least one server device and from a client device corresponding to an originating user, a protected electronic document and a user identity of a participant user, wherein the content of the protected electronic document is inaccessible by the at least one server device based on the at least one server device not receiving a key to unprotect the protected electronic document;
    performing, by the at least one server device, a hash function on the protected electronic document to generate a first server-generated ID element;
    providing, by the at least one server device, the first server-generated ID element to the client device corresponding to the originating user for verification that the server-generated ID element matches a client-generated ID element generated at the client device corresponding to the originating user;
    providing, by the at least one server device, the protected electronic document to a client device corresponding to the participant user;
    receiving, from the client device corresponding to the participant user, a signed version of the protected electronic document comprising an electronic signature of the participant user;
    performing the hash function on the signed version of the protected electronic document to obtain a second server-generated ID element for the signed version of the protected document; and
    providing, by the at least one server device, the second server-generated ID element to the client device corresponding to the participant user for verification that the second-generated ID element matches a second client-generated ID element generated at the client device corresponding to the participant user.

2. The method as recited in claim 1, further comprising receiving a verification message from the client device corresponding to the originating user, the verification message indicating that the first server-generated ID element matches the client-generated ID element.

3. The method as recited in claim 2, wherein the first server-generated ID element comprises a hash value resulting from performing the hash function on the protected document.

4. The method as recited in claim 1, wherein receiving the electronic signature from the participant user comprises receiving a digital signature from the client device corresponding to the participant user.

5. The method as recited in claim 1, wherein the electronic signature of the participant user comprises a digital representation of the participant user's signature.

6. The method as recited in claim 1, further comprising:
    receiving, from the originating user, an identification of an additional participant user; and
    providing the protected electronic document to the additional participant user.

7. The method as recited in claim 6, further comprising receiving another electronic signature from the additional participant user.

8. The method as recited in claim 1, further comprising generating an event log associated with the protected electronic document, the event log comprising information associated with the received electronic signature.

9. The method as recited in claim 8, further comprising:
    receiving a request for signature information; and
    in response the received request for signature information, providing information from the generated event log.

10. The method as recited in claim 9, further comprising providing access to the protected electronic document and the received electronic signature.

11. The method as recited in claim 1, wherein the signed version of the protected electronic document comprises a leading edge portion that includes the protected electronic document and an append portion that comprises a digital signature.

12. The method as recited in claim 11, wherein performing the hash function on the signed version of the protected electronic document comprises performing the hash function on the leading edge portion to determine the second server-generated ID element.

13. A system of providing a secure electronic document signature service comprising:
    at least one processor; and
    at least one non-transitory computer readable storage medium storing instructions thereon that, when executed by the at least one processor, cause the system to:
    receive by at least one server device and from a client device corresponding to an originating user, a protected electronic document and a user identity of a participant user, wherein the content of the protected electronic document is inaccessible by the at least one server device based on the at least one server device not receiving a key to unprotect the protected electronic document;
    perform, by the at least one server device, a hash function on the protected electronic document to generate a first server-generated ID element;
    provide, by the at least one server device, the first server-generated ID element to the client device corresponding to the originating user for verification that the first server-generated ID element matches a client-generated ID element generated at the client device corresponding to the originating user;
    provide, by the at least one server device, the protected electronic document to a client device corresponding to the participant user;
    receive, from the client device corresponding to the participant user, a signed version of the protected electronic document comprising an electronic signature of the participant user;
    perform the hash function on the signed version of the protected electronic document to obtain a second server-generated ID element for the signed version of the protected document; and
    provide, by the at least one server device, the second server-generated ID element to the client device corresponding to the participant user for verification that the second-generated ID element matches a second client-generated ID element generated at the client device corresponding to the participant user.

14. The system as recited in claim 13, wherein the electronic signature of the participant user comprises a digital representation of the participant user's signature.

15. The system as recited in claim 14, wherein the signed version of the protected electronic document comprises a leading edge portion that includes the protected electronic document and an append portion that comprises a digital signature.

16. The system as recited in claim 15, wherein performing the hash function on the signed version of the protected electronic document comprises performing the hash function on the leading edge portion to determine the second server-generated ID element.

17. The system as recited in claim 13, further comprising receiving, from the client device associated with the originating user, an indication of a method to determine the first server-generated ID element.

18. The system as recited in claim 17, wherein the indication of a method to determine the first server-generated ID element comprises an identification of a cryptographic hash function.

19. The system as recited in claim 13, further comprising instructions that, when executed by the at least one processor, cause the system to generate an event log associated with the protected electronic document, the event log comprising information associated with the received electronic signature.

20. The system as recited in claim 19, further comprising instructions that, when executed by the at least one processor, cause the system to:
    receive a request for signature information; and
    in response the received request for signature information, provide information from the generated event log.

* * * * *